(12) United States Patent
Spalink

(10) Patent No.: US 6,226,333 B1
(45) Date of Patent: May 1, 2001

(54) QAM DE-MAPPING CIRCUIT

(75) Inventor: Gerd Spalink, Stuttgart (DE)

(73) Assignee: Sony International (Europe) GmbH, Cologne (DE)

( * ) Notice: Subject to any disclaimer, the term of this patent is extended or adjusted under 35 U.S.C. 154(b) by 0 days.

(21) Appl. No.: 09/128,293

(22) Filed: Aug. 3, 1998

(30) Foreign Application Priority Data

Aug. 5, 1997 (EP) ................................................ 97113520

(51) Int. Cl.$^7$ .............................. H04L 27/38; H04L 25/06
(52) U.S. Cl. ........................ 375/340; 375/332; 329/304; 714/791
(58) Field of Search .................................. 375/261, 262, 375/264, 265, 340, 341, 329–332; 714/794, 795, 791; 329/304

(56) References Cited

U.S. PATENT DOCUMENTS

| | | | |
|---|---|---|---|
| 4,247,944 | * | 1/1981 | Sifford . |
| 4,646,325 | * | 2/1987 | Zuranski et al. . |
| 4,709,377 | * | 11/1987 | Martinez et al. . |
| 5,214,672 | * | 5/1993 | Eyuboglu et al. ..................... 375/254 |
| 5,253,271 | * | 10/1993 | Montgomery .......................... 375/295 |
| 5,329,551 | * | 7/1994 | Wei ........................................ 375/286 |
| 5,548,615 | * | 8/1996 | Wei ........................................ 375/281 |
| 5,838,727 | * | 11/1998 | Lyon et al. ............................ 375/261 |
| 5,878,085 | * | 3/1999 | McCallister et al. ................. 375/280 |

FOREIGN PATENT DOCUMENTS

| | | | |
|---|---|---|---|
| 0 383 632 | * | 8/1990 | (EP) . |
| 0 555 013 | * | 8/1993 | (EP) . |
| 2 294 852 | * | 5/1996 | (GB) . |
| WO 92/02092 | * | 2/1992 | (WO) . |
| WO 93/25034 | * | 12/1993 | (WO) . |

* cited by examiner

*Primary Examiner*—Young T. Tse
(74) *Attorney, Agent, or Firm*—Frommer Lawrence & Haug, LLP.; William S. Frommer

(57) ABSTRACT

According to the invention, information from a differential decoder (1) receiving the MSB of the in-phase component and the MSB of the quadrature component is used to derotate the LSBs of the in-phase component and the LSBs of the quadrature component into the first quadrant with a rotator (2). Then only one quadrant is demapped by a single quadrant demapper (3). Thereby, the look-up table necessary for the demapping circuit is reduced considerably. The output signal of the QAM de-mapping circuit is build from the demapped LSBs of the in-phase and quadrature components output by the single quadrant demapper (3) and the outputs of the differential decoder (1).

8 Claims, 7 Drawing Sheets

FIG. 5
(Prior Art)

16-QAM $I_k Q_k = 10$      Q      $I_k Q_k = 00$

```
1011   1001  |  0010   0011
 O      O    |   O      O 1010   1000  |  0000   0001
 O      O    |   O      O
─────────────┼──────────────
1101   1100  |  0100   0110      I
 O      O    |   O      O 1111   1110  |  0101   0111
 O      O    |   O      O
```

$I_k Q_k = 11$          $I_k Q_k = 01$

32-QAM

64-QAM

| $I_kQ_k=10$ | | | | Q | | | | $I_kQ_k=00$ |
|---|---|---|---|---|---|---|---|---|
| 101100 | 101110 | 100110 | 100100 | 001000 | 001001 | 001101 | 001100 | |
| O | O | O | O | O | O | O | O | |
| 101101 | 101111 | 100111 | 100101 | 001010 | 001011 | 001111 | 001110 | |
| O | O | O | O | O | O | O | O | |
| 101001 | 101011 | 100011 | 100001 | 000010 | 000011 | 000111 | 000110 | |
| O | O | O | O | O | O | O | O | |
| 101000 | 101010 | 100010 | 100000 | 000000 | 000001 | 000101 | 000100 | |
| O | O | O | O | O | O | O | O | |
| 110100 | 110101 | 110001 | 110000 | 010000 | 010010 | 011010 | 011000 | I |
| O | O | O | O | O | O | O | O | |
| 110110 | 110111 | 110011 | 110010 | 010001 | 010011 | 011011 | 011001 | |
| O | O | O | O | O | O | O | O | |
| 111110 | 111111 | 111011 | 111010 | 010101 | 010111 | 011111 | 011101 | |
| O | O | O | O | O | O | O | O | |
| 111100 | 111101 | 111001 | 111000 | 010100 | 010110 | 011110 | 011100 | |
| O | O | O | O | O | O | O | O | |
| $I_kQ_k=11$ | | | | | | | | $I_kQ_k=01$ |

$I_k Q_k$ are the two MSB's in each quadrant

QAM DE-MAPPING CIRCUIT

DESCRIPTION

The invention relates to a QAM de-mapping circuit. More particularly, it relates to a QAM de-mapping circuit used in a receiver according to the digital multi-programme system for television, sound and data services for cable distribution.

A draft for an European Telecommunication Standard (ETS) has been produced in August 1994 under the authority of the Joint Technical Committee (JTC) of the European Broadcasting Union (EBU) and the European Telecommunications Standards Institute (ETSI). This draft ETS describes modulation, channel coding and framing structure for digital multi-programme television by cable. It is based on the studies carried out by the European Digital Video Broadcasting (DVB) project.

According to this draft ETS the cable system is defined as functional block of equipment and the following process is applied as shown in FIG. 3. FIG. 3 shows the conceptual block diagram of elements at the cable head-end and the receiving site.

In the cable head-end a baseband interface 31 serves as connection to local MPEG-2 program sources, contribution links, re-multiplexers, etc.. This data is sent in MPEG-2 transport mux packets to a base band physical interface 32 that adapts the data structure to the format of the signal source and performs a synchronization in accordance with a clock signal. Here, the framing structure is in accordance with MPEG-2 transport layer including sync bytes.

Thereafter, the Sync 1-Byte is inverted according to the MPEG-2 framing structure in a Sync 1 inversion & randomization circuit 33 that also randomizes the data stream for spectrum shaping purposes. The resulting data stream has a width of 8 bit and is led to a Reed-Solomon coder 34 that applies a shortened Reed-Solomon code to each randomized transport packet to generate an error-protected packet. This code is also applied to the sync byte itself. Thereafter, a convolutional interleaver 35 performs a depth I=12 convolutional interleaving of the error-protected packets. Here, the periodicity of the sync bytes remains unchanged.

The bytes generated by the interleaver 35 are converted into QAM symbols in a byte to m-tuple conversion stage 36. The resulting output signal has a width of m bit. In order to get a rotation-invariant constellation, a differential encoding stage 37 following thereafter applies a differential encoding of the two Most Significant Bits (MSBs) of each symbol.

The final stage in the cable head-end is a QAM modulation and physical interface 38 that performs a square-root raised cosine filtering of the I and Q signals prior to QAM modulation. This is followed by interfacing the QAM modulated signal to a Radio-Frequency (RF) cable channel 40.

All devices 33 to 38 are synchronized and/or controlled by a clock & sync generator 39 that is receiving the same clock signal as the baseband physical interface 32 and additionally a control signal of the Sync 1 inversion & randomization circuit 33.

The cable receiver performs the inverse signal processing, as described for the modulation process above, in order to recover the baseband signal.

Therefore, the signal from the RF cable channel 40 is received by a RF physical interface & QAM demodulation circuit 41 that sends a control signal to a carrier & clock & sync recovery circuit 49 synchronizing and/or controlling all circuits of the cable receiver and the QAM demodulated signal to a matched filter & equalizer circuit 42.

The output signal from the matched filter & equalizer circuit 42 has a width of m bit and is sent to a differential decoder 43, whereafter it undergoes a symbol to byte mapping in a symbol to byte mapping circuit 44. Here, the output signal has a width of 8 bit.

The next stage is a convolutional deinterleaving in a convolutional deinterleaver 45. The convolutional deinterleaved, but still error-protected packets pass through a Reed-Solomon decoder 46 and a Sync 1 inversion & energy dispersal removal circuit 47 before they reach a baseband physical interface 48 that produces MPEG-2 transport mux packets according to the local MPEG-2 programme sources, contribution links, remultiplexers, etc. and a clock signal.

As the present invention mainly concerns the differential decoding in the cable receiver, the following description will be only directed to this stage and the corresponding stage in the cable head-end.

In the cable head-end, after the byte to symbol mapping, the two significant bits of each symbol will then be differentially coded in order to obtain a π/2 rotation-invariant QAM constellation. The differential encoding of the two MSBs shall be given by the following expression:

$$I_k = \overline{(A_k \oplus B_k)} \cdot (A_k \oplus I_{k-1}) + (A_k \oplus B_k) \cdot (A_k \oplus Q_{k-1})$$
$$Q_k = \overline{(A_k \oplus B_k)} \cdot (B_k \oplus Q_{k-1}) + (A_k \oplus B_k) \cdot (B_k \oplus I_{k-1}).$$

FIG. 4 gives an example of the implementation of the byte to symbol conversion. In the example shown in FIG. 4, 8 bits parallel supplied to the byte to m-tuple conversion circuit 36 from the convolutional interleaver 35 partially undergo a differential encoding in the differential encoder 37 before being supplied to a mapping circuit 37b that belongs to the differential decoder 37. Only the most significant bits $A_k$, $B_k$ at the output of the byte to m-tuple converter 36 are led to the differential encoder 37. The differential encoder 37 then produces the most significant bits $Q_k$, $I_k$ of the in-phase and quadrature phase components of the modulated signal. The mapping circuit 37b also receives the lower q bits of the byte to m-tuple conversion. For 16-QAM q equals to 2, for 32-QAM q equals to 3 and for 64-QAM q equals to 4. The mapping circuit 37b outputs the in-phase component I and the quadrature component Q.

The modulation of the system is a quadrature amplitude modulation (QAM) with 16, 32, or 64 points in the constellation diagram.

The system constellation diagrams for 16-QAM, 32-QAM and 64-QAM are given in FIG. 5a to c, respectively, assuming that $I_k$ and $Q_k$ are the two MSBs in each quadrant. As shown in FIG. 5, the constellation points in quadrant 1 shall be converted to quadrants 2, 3 and 4 by changing the two MSBs (i.e. $I_k$ and $Q_k$) and by rotating the q LSBs according to the following rule given in Table 1.

TABLE 1

| Quadrant | MSBs | LSBs rotation |
| --- | --- | --- |
| 1 | 00 | |
| 2 | 10 | +π/2 |
| 3 | 11 | +π |
| 4 | 01 | +3π/2 |

The differential decoder 43 simply serves to perform the signal processing inverse to that described above. A unit combining a conventional de-mapping circuit and a conventional differential decoder is shown in FIG. 6.

In FIG. 6 a n bit signal arrives at a four quadrant demapper 50 to assign the data bit values shown in FIG. 5 to received signal amplitudes. The n bits output by the four quadrant demapper 50 are split up into two MSBs which undergo a differential decoding in a differential decoder 1 and n−2 LSBs. After the differential decoding, the two MSBs are recombined with the n−2 LSBs, before n bit are given out to the symbol to byte mapping circuit 44.

The conventional four quadrant demapper 50 uses a look-up table, which must have the size $2^n$ times n bit. For 64-QAM is n=6 and the size of the look-up table is $2^6 \cdot 6 = 64 \cdot 6 = 384$ bits.

It is the object of the invention to provide a QAM-demapping circuit, responsible for the differential decoding, that has a simple structure and a reduced size for the look-up table.

This object is solved by a QAM de-mapping circuit, comprising a differential decoder to perfom a differential decoding of 2 Bits of each n Bit symbol received, characterized by a rotator to derotate the other n−2 Bits of each n Bit symbol received into the first quadrant on the basis of the 2 Bits of each n Bit symbol supplied to the differential decoder, and a single quadrant demapper to assign data bit values to received signal amplitudes on the basis of the derotated n−2 Bits of each n Bit symbol received, wherein 2 output signals of the QAM de-mapping circuit are derived from the differential decoder and n−2 output signals of the QAM de-mapping circuit are derived from said single quadrant demapper.

Further preferred embodiments of the invention are defined in the dependent claims 2 to 8.

In particular, said rotator comprises only n=2 inverters, preferrably two groups of (n−2)/2 inverters, 2·(n−2) switches, preferrably four groups of (n−2)/2 switches, and one exclusive-or-gate to perform Its operation. This rotator is defined in dependent claim 3.

Also the single quadrant demapper can be built only with a few elements, e.g. four exclusive-or-gates for a 256-QAM, two exclusive-or-gates for a 64-QAM or only two lines for a 16-QAM. The design of these respective single quadrant demappers is defined in claims 5, 6 and 7, respectively. The single quadrant demapper can also be a look-up table with a reduced size in comparison to the conventional look-up table for the four quadrant demapper.

Further objects, features and advantages of the present invention will become apparent from the following description of a preferred embodiment thereof taken in conjunction with the drawings, wherein:

Figure 5:
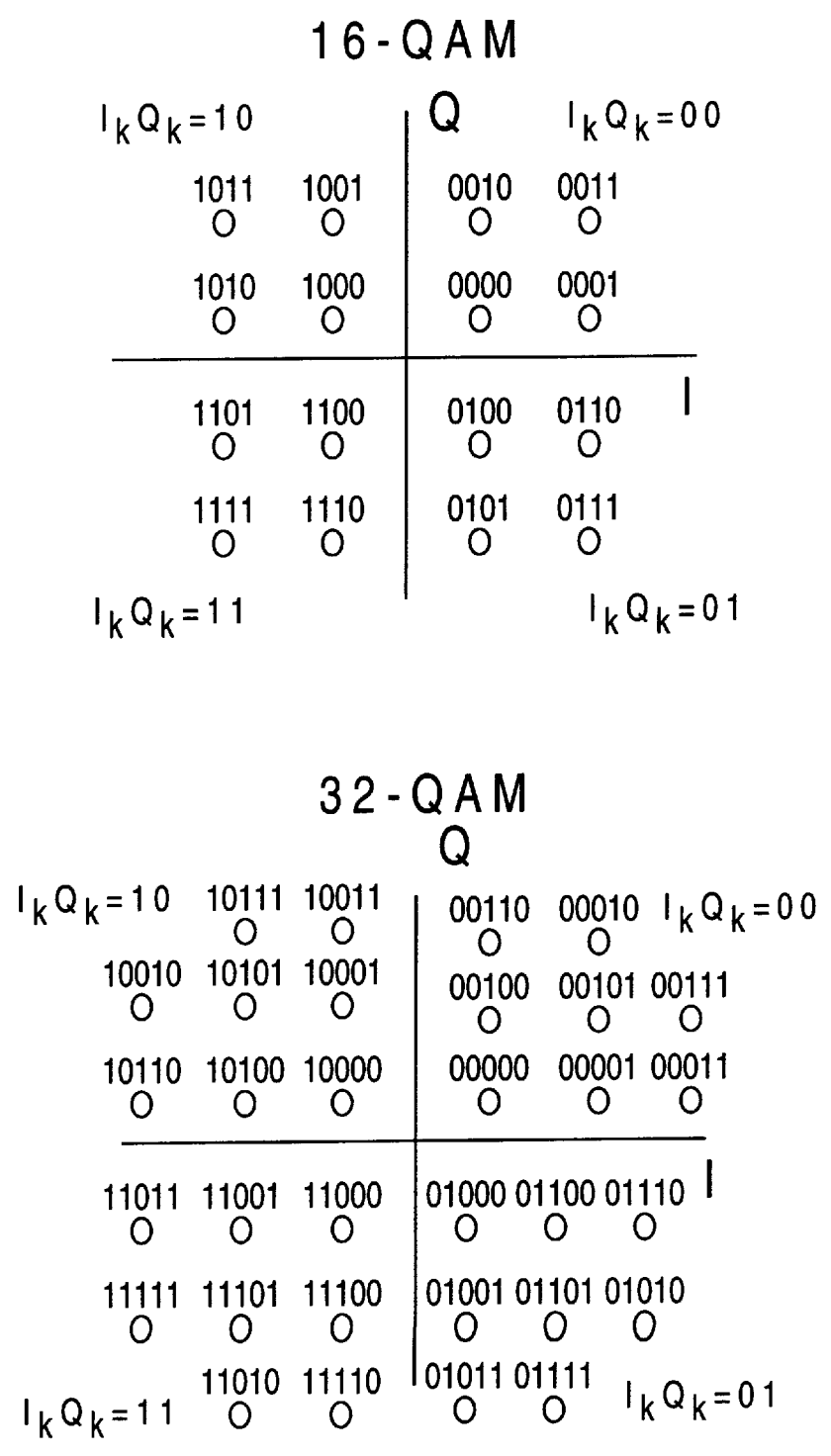

FIG. 5 shows constellation diagrams for 16-QAM, 32-QAM and 64-QAM; and

Figure 1:
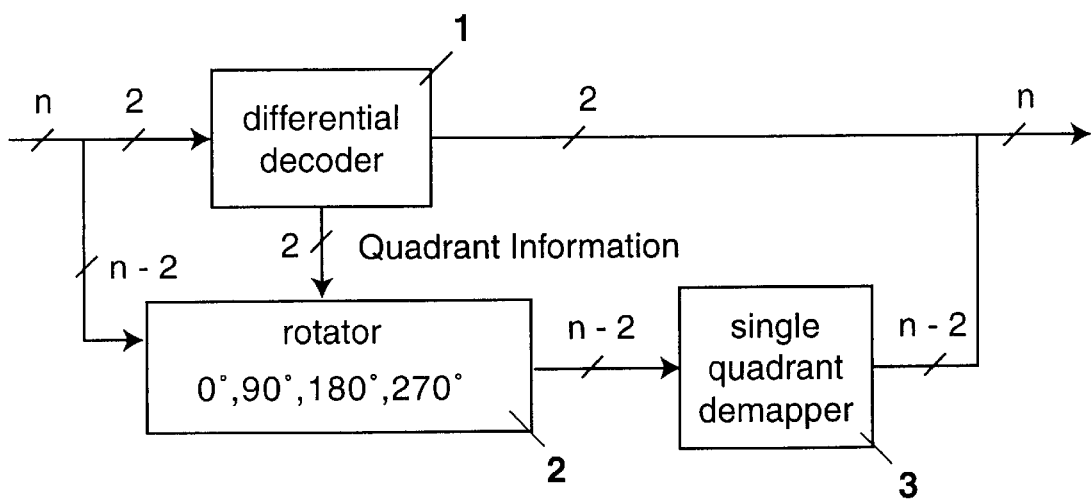
FIG. 1 shows a block diagram of a demapping circuit according to the invention.
Figure 3A:
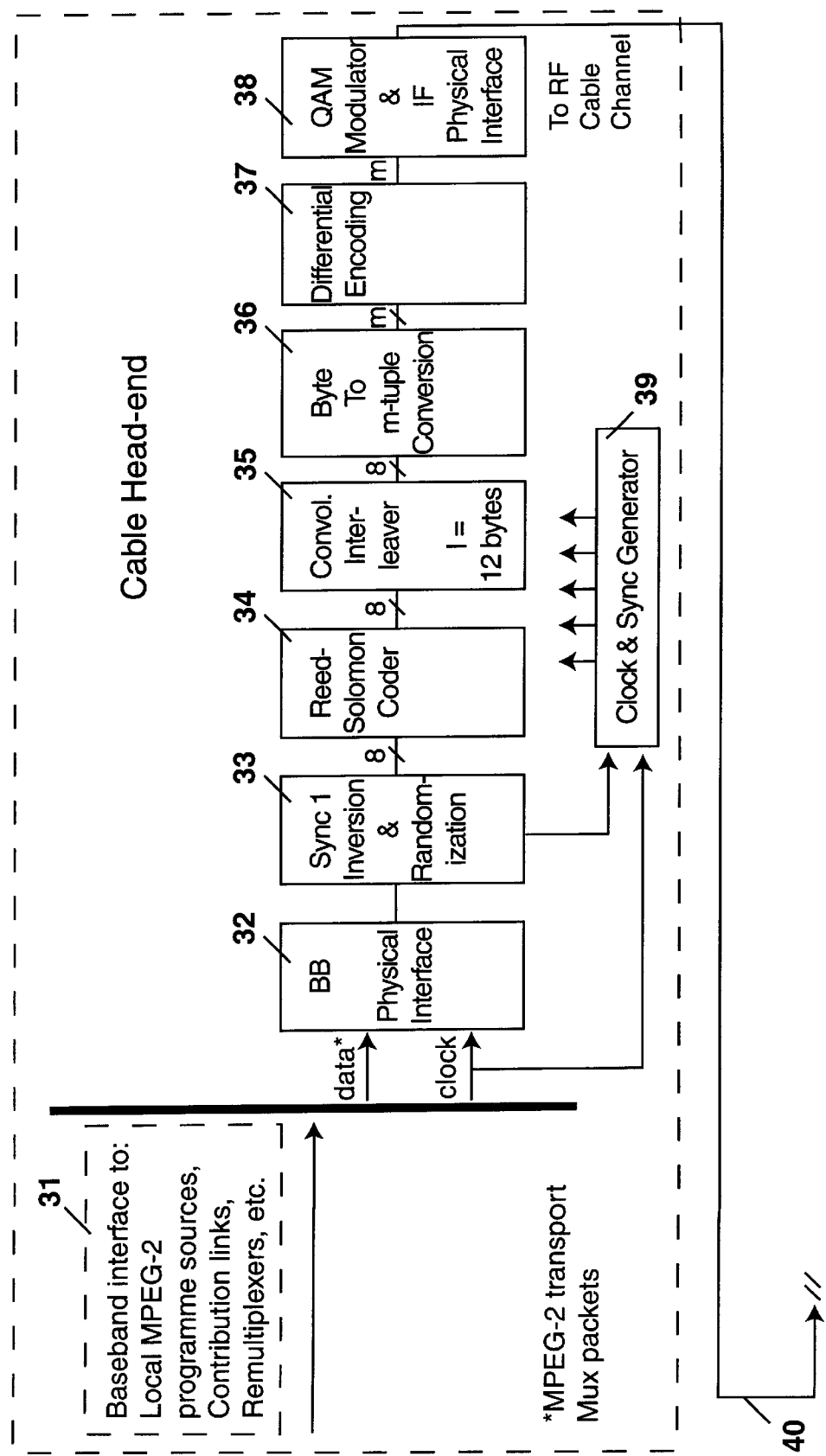
FIG. 3 shows a conceptional diagram of elements at the cable head-end and receiving site of the digital multi-programme system for television, sound and data services for cable distribution.
Figure 3B:
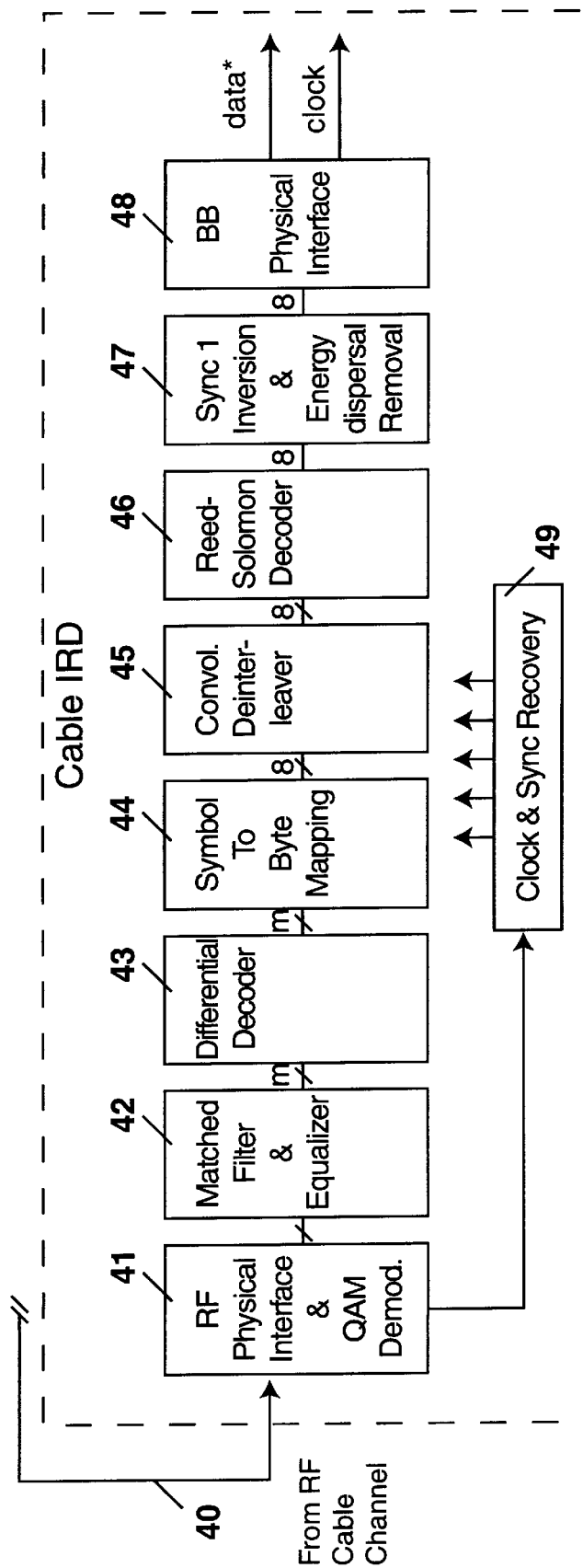
Figure 4:
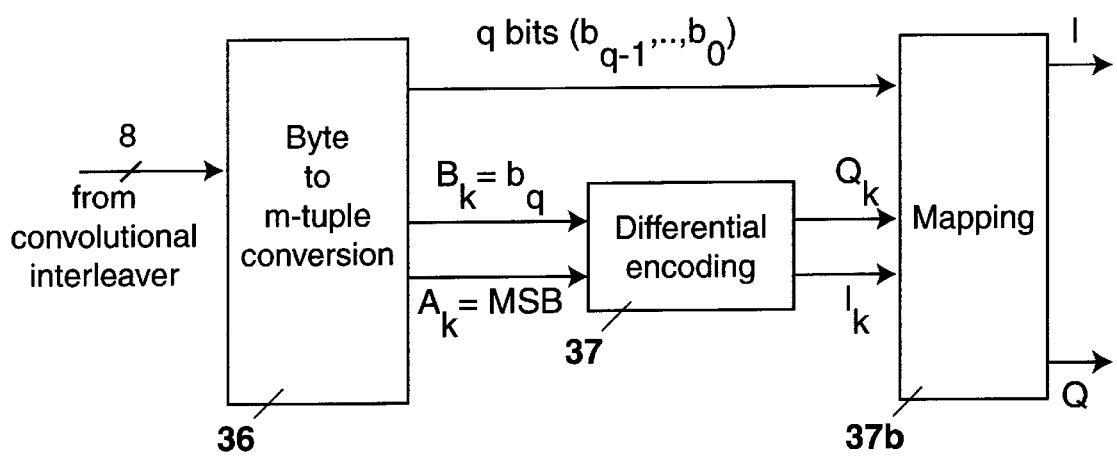
FIG. 4 shows an example implementation of the byte to m-tuple conversion and the differential encoding of the two MSBs in the cable head-end shown in FIG. 3.
Figure 6:
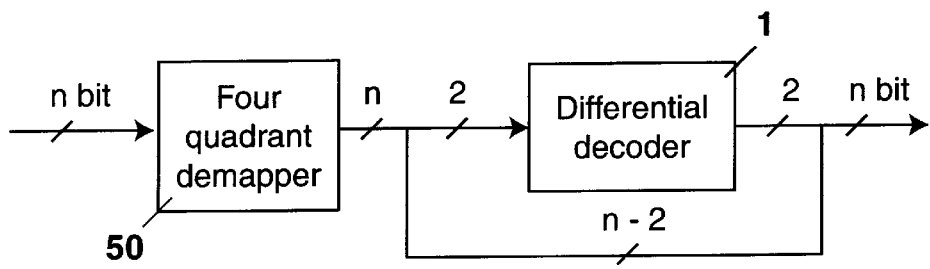
FIG. 6 shows a conventional demapping circuit, which corresponds to the differential decoder 43 shown in the cable receiver of FIG. 3.

The four quadrant demapping circuit according to the invention shown in FIG. 1 comprises a differential decoder 1, a rotator 2 and a single quadrant demapper 3. The incoming n bit signal is split up into the MSB of the in-phase component and the MSB of the quadrature component, which are led to the differential decoder 1, and in the n=2 LSBs of both components, which are fed to the rotator 2. Here, the LSBs are rotated by 0°, 90°, 180° or 270° on the basis of the quadrant information that is given from the differential decoder 1. In a preferred embodiment, the quadrant information can be directly derived from the MSB of the in-phase component and the MSB of the quadrature component. The n=2 bits rotated for example into the first quadrant are then fed to a single quadrant demapper 3 that assigns data bit values to received signal amplitudes. The differential decoder 1 performs a differential decoding of the MSB of the in-phase component and the MSB of the quadrature component, like also the differential decoder 1 shown in FIG. 6 does. The two bits of the differential decoder 1 and the n=2 bits of the single quadrant demapper 3 are then recombined, before they are fed to a further processing stage, like the symbol to byte mapping circuit 44 shown in FIG. 3.

Figure 2:
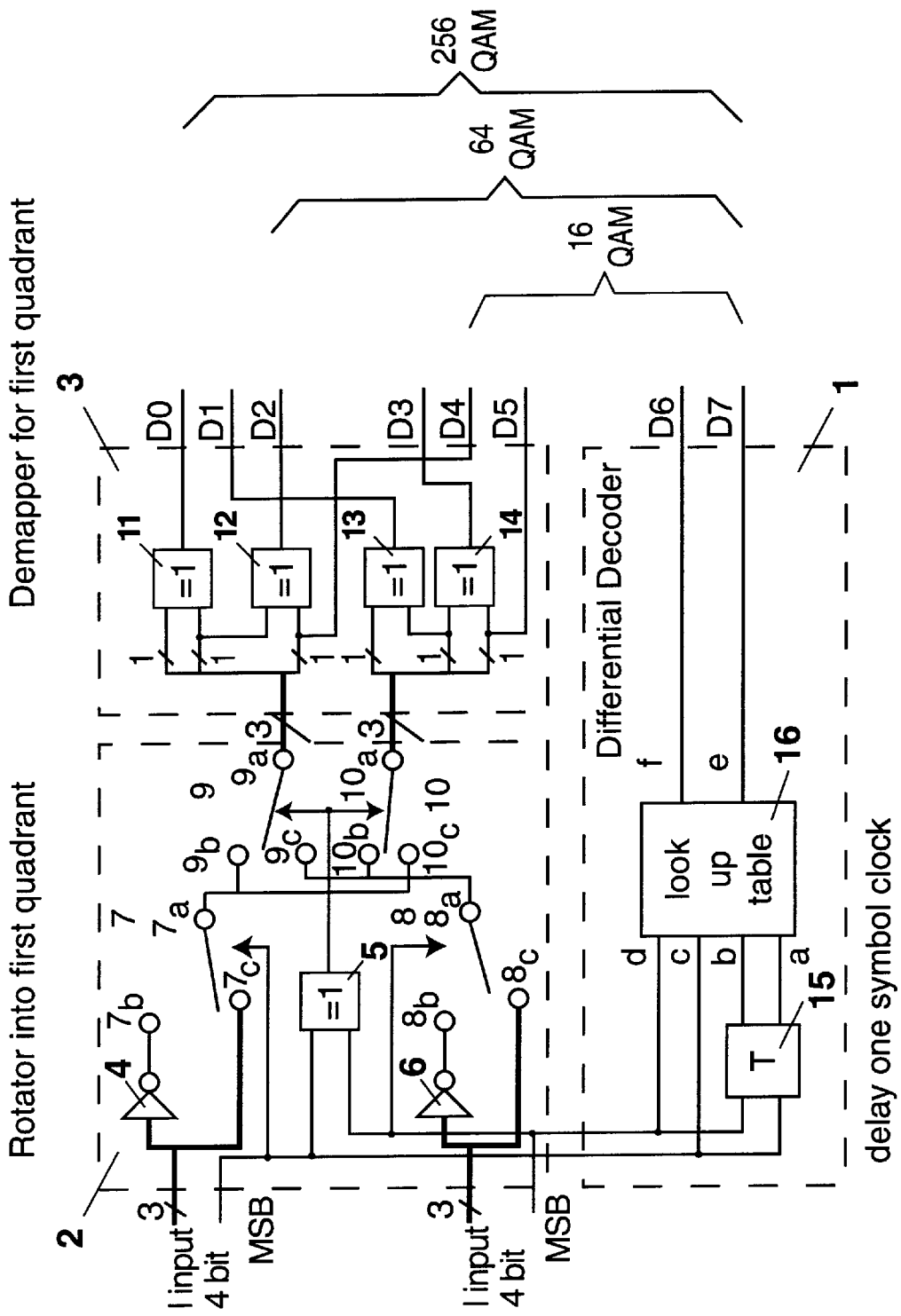
FIG. 2 shows a detailed circuit diagram of a preferred embodiment of the demapping circuit shown in FIG. 1.

FIG. 2 shows a detailed circuit diagram of a preferred embodiment of the demapping circuit shown in FIG. 1. In this embodiment n is set to 8 which implies that a 256 QAM can be demapped. The 8 bit input signal comprises a 4 bit in-phase component fed to an I input and a 4-bit quadrature component fed to a Q input. The rotator 2 rotates every input signal into the first quadrant and supplies the rotated signal to a demapper 3 for the first quadrant. The MSBs of the in-phase component and the quadrature component are fed to the rotator 2 and the differential decoder 1. The output signal of the demapping circuit is built by six bits from the demapper 3 and two bits from the differential decoder 1.

It is presupposed that the in-phase and the quadrature components are in a two's complement notation.

The rotator 2 into the first quadrant receives at its I-input three lower bits of the in-phase component and the corresponding MSB. The three lower bits are fed to first input terminals 7c of a first switch 7 and via three inverters 4 to second input terminals 7b of said first switch 7. The first switch 7 is controlled to connect its three output terminals 7a either to its three first input terminals 7c or its three second input terminals 7b dependent on the MSB of the in-phase component. If the MSB of the in-phase component equals to "0" the three output terminals 7a are connected to the three first input terminals 7c and if the MSB of the in-phase components equals to "1" to three output terminals 7a are connected to the three second input terminals 7b.

Correspondingly, the 4 bit quadrature component is split into three lower bits and the corresponding MSB at the Q input of the rotator 2. The three lower bits are fed to three first input terminals 8c of a second switch 8 and through three inverters 6 to three second input terminals 8b of said second switch 8. The three output terminals 8a of the second switch 8 are controlled to be either connected to the three first input terminals 8c or the second input terminals 8b of the second switch 8 dependent on the MSB of the quadrature component. If the MSB of the quadrature component equals to "0", the three output terminals 8a are respectively connected to the three first input terminals 8c and if the MSB equal to "1", the three output terminals 8a are respectively connected to the three second input terminals 8b.

The three output terminals 7a of the first switch 7 are respectively connected to three second input terminals 9b of a third switch 9 and to three first input terminals 10c of a fourth switch 10. The three output terminals 8a of the second switch 8 are respectively connected to three first input terminals 9c of said third switch 9 and to three second input terminals 10c of said fourth switch 10. Three output terminals 9a of said third switch 9 constitute a first group of output terminals of said rotator and three output terminals 10a of said fourth switch 10 constitute a second group of output terminals of said rotator 2. The three output terminals 9a of said third switch 9 and the three output terminals 10a of said fourth switch 10 are controlled to be respectively connected either to the corresponding three first input terminals 9c, 10c or the corresponding three second input terminals 9b, 10b in dependence of a control signal.

Said control signal controlling said third and fourth switch is generated by an exclusive-or-gate 5 that receives the MSB of the in-phase component and the MSB of the quadrature component at its two input terminals. The three output terminals 9a of the third switch 9 are respectively connected to the three second input terminals 9b of said third switch 9 when said control signal equals to "0" and are connected to the three first input terminals 9c of said third switch 9 when said control signal equals to "1". The three output terminals 10a of said fourth switch 10 are connected to said three second input terminals 10b of said fourth switch 10 when said control signal equals to "0" and are connected to said three first input terminals 10c when said control signal equals to "1".

The first group of three outputs and the second group of three outputs of the rotator 2 are fed to the demapper 3 for the first quadrant. The least significant bit of the first group of outputs is fed to a first input terminal of a second exclusive-or-gate 11. The most significant bit of said three bits of the first group of outputs in fed to a first input terminal of a third exclusive-or-gate 12. The middle bit of said first group of outputs in fed to second input terminals of said second exclusive-or-gate 11 and said third exclusive-or-gate 12.

Correspondingly the least significant bit of said three outputs of the second group of outputs is fed to a first input terminal of a fourth exclusive-or-gate 13, the most significant bit of said group of outputs is fed to a first input terminal of a fifth exclusive-or-gate 14 and the middle bit of said second group of outputs is fed to second input terminals of said fourth exclusive-or-gate 13 and said fifth exclusive-or-gate 14.

The outputs of said demapper 3 for the first quadrant are build from the following signals in the order of the least significant bit to the most significant bit: D0, which is the least significant bit of the demapper 3, equals to the output signal of the second exclusive-or-gate 11; D1 equals to the output signal of the fourth exclusive-or-gate 13; D2 equals to the output signal of the third exclusive-or-gate 12; D3 equals to the output signal of the fifth exclusive-or-gate 14, D4 equals to the most significant bit of said first group of outputs of the rotator that is also supplied to the first input terminal of the third exclusive-or-gate 12; and D5, which is the most significant bit of the outputs of the demapper D3, equals to the most significant bit of the second group of outputs of the rotator 2, which is also supplied to the first input terminal of the fifth exclusive-or-gate 14.

The two highest bits of the whole demapping circuit are supplied from the differential decoder 1. The differential decoder 1 receives the MSB of the in-phase component and the MSB of the quadrature component and feeds them to a look-up table 16. The look-up table 16 also receives both MSBs delayed by one symbol clock. Dependent on these four Input signals two output signals are generated. These two output signals constitute the two highest bits of the whole demapping circuit.

The rotator into the first quadrant works as follows:

The circuit operates with incoming I and Q magnitudes, which must be represented in two's complement notation. In this case, the most significant bits are the sign bits and can be used to determine the actual quadrant of the signal.

Switch positions drawn, the output terminals 7a and 8a are respectively connected to the first input terminals 7c and 8c and the output terminals 9a and 10a are respectively connected to the second input terminals 9b and 10b, are for both sign bits equal to "0", e.g. a value out of the first quadrant. This way the inverter blocks 4, 6 are not used and no change of the I and Q values takes place.

If the sign bit of I is high, i.e. "1", and the sign bit of Q is low, i.e. "0", the value is in the second quadrant. Now the inverters 4 for the I signal are used and additionally the I and Q values are swapped.

If the sign bit of I is low and the sign bit of Q is high, the value is in the fourth quadrant. Now the inverters 6 for the Q signal are used and additionally the I and Q values are swapped.

If both I and Q sign bits are high, the value is in the third quadrant. Now both inverter blocks 4, 6 are used, but no swapping of the I and Q values takes place.

In the following, an example for a lock-up table of the differential decoder 1 will be given. When the delayed MSB of the in-phase component is termed a, the delayed MSB of the quadrature component is termed b, the actual MSB of the in-phase component is termed c and the actual MSB of the quadrature component is termed d, the output e corresponding to the MSB; i.e. D7, of the demapping circuit and the output f corresponding to the output signal D6 of the demapping circuit are given by the table 2 below.

TABLE 2

| a | b | c | d | e | f |
|---|---|---|---|---|---|
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 1 | 0 |
| 0 | 1 | 0 | 1 | 0 | 0 |
| 0 | 1 | 1 | 0 | 1 | 1 |
| 0 | 1 | 1 | 1 | 0 | 1 |
| 1 | 0 | 0 | 0 | 0 | 1 |
| 1 | 0 | 0 | 1 | 1 | 1 |
| 1 | 0 | 1 | 0 | 0 | 0 |
| 1 | 0 | 1 | 1 | 1 | 0 |
| 1 | 1 | 0 | 0 | 1 | 1 |
| 1 | 1 | 0 | 1 | 1 | 0 |
| 1 | 1 | 1 | 0 | 0 | 1 |
| 1 | 1 | 1 | 1 | 0 | 0 |

The circuit shown in FIG. 2 supports 16, 64 and 256-QAM as defined in the DVB-Standard. For 256 QAM all outputs D0 to D7 are used. For 64-QAM only outputs D2 to D7 are used. For 16-QAM only outputs D4 to D7 are used. The circuit components of the Demapper 3 not used for a QAM of lower order can be omitted if no QAM of higher order should be supported.

With the circuit of the invention the size of the complete look-up table is reduced to $2^{(n-2)} \cdot (n-2)$ bits, which is a reduction of $(3 \cdot n+2) \cdot 2^{(n-2)}$ in terms of bits to store. As described above, for a 64-QAM with n=6, the normal look-up table size is $2^6 \cdot 6 = 64 \cdot 6 = 384$ bits, whereas the reduced look-up table size is $2^4 \cdot 4 = 64$ bits. It follows that $(3 \cdot 6+2) \cdot 2^4 = 320$ bits are saved.

According to the prior art, the following example of a demapper look-up table as shown in table 3 is required for a 16-QAM.

TABLE 3

| Q1 | Q0 | I1 | I0 | D7 | D7 | D5 | D4 |
|----|----|----|----|----|----|----|----|
| 0 | 0 | 0 | 0 | 0 | 0 | 0 | 0 |
| 0 | 0 | 0 | 1 | 0 | 0 | 0 | 1 |
| 0 | 0 | 1 | 0 | 1 | 0 | 1 | 0 |
| 0 | 0 | 1 | 1 | 1 | 0 | 0 | 0 |
| 0 | 1 | 0 | 0 | 0 | 0 | 1 | 0 |
| 0 | 1 | 0 | 1 | 0 | 0 | 1 | 1 |
| 0 | 1 | 1 | 0 | 1 | 0 | 1 | 1 |
| 0 | 1 | 1 | 1 | 1 | 0 | 0 | 1 |
| 1 | 0 | 0 | 0 | 0 | 1 | 0 | 1 |
| 1 | 0 | 0 | 1 | 0 | 1 | 1 | 1 |
| 1 | 0 | 1 | 0 | 1 | 1 | 1 | 1 |
| 1 | 0 | 1 | 1 | 1 | 1 | 1 | 0 |
| 1 | 1 | 0 | 0 | 0 | 1 | 0 | 0 |
| 1 | 1 | 0 | 1 | 0 | 1 | 1 | 0 |
| 1 | 1 | 1 | 0 | 1 | 1 | 0 | 1 |
| 1 | 1 | 1 | 1 | 1 | 1 | 0 | 0 |

Whereas according to the invention no look-up table is required, since the rotated Q0 bit is data bit 5 and the rotated I0 bit is data bit 4.

What is claimed is:

1. QAM de-mapping circuit, comprising
   a differential decoder (1) to perfom a differential decoding of 2 Bits of each n Bit symbol received,
   characterized by
      a rotator (2) to derotate the other n-2 Bits of each n Bit symbol received into the first quadrant on the basis of the 2 Bits of each n Bit symbol supplied to the differential decoder (1), and
      a single quadrant demapper (3) to assign data bit values to received signal amplitudes on the basis of the derotated n-2 Bits of each n Bit symbol received,
   wherein 2 output signals of the QAM de-mapping circuit are derived from the differential decoder (1) and n=2 output signals of the QAM de-mapping circuit are derived from said single quadrant demapper (3).

2. QAM de-mapping circuit according to claim 1, characterized in that
   said n Bit symbol received comprises a n/2 Bit inphase component and a n/2 Bit quadrature component and both components are supplied in a two's complement notation;
   said 2 Bits supplied to the differential decoder (1) are the Most Significant Bit of said inphase component of said symbol received and the Most Significant Bit of said quadrature component of said symbol received; and
   said n-2 Bits supplied to said rotator (2) are the lower Bits of said inphase component of said symbol received and the lower Bits of said quadrature component of said symbol received.

3. QAM de-mapping circuit according to claim 2, characterized in that said rotator (2) comprises:
   a first inverter (4) receiving said lower Bits of said inphase component and respectively inverting each of said Bits;
   a first switch (7) having first input terminals (7c) respectively receiving said lower Bits of said inphase component, second input terminals (7b) respectively receiving said inverted lower Bits of said inphase component from the outputs of said first inverter (4), and output terminals (7a) to be respectively connected to said first input terminals (7c) or said second input terminals (7b) in response to said Most Significant Bit of said inphase component so that said output terminals (7a) are connected to said first input terminals (7c) when said Most Significant Bit has a low level and to said second input terminals (7b) when said Most Significant Bit has a high level;
   a second inverter (6) receiving said lower Bits of said quadrature component and respectively inverting each of said Bits;
   a second switch (8) having first input terminals (8c) respectively receiving said lower Bits of said quadrature component, second input terminals (8b) respectively receiving said inverted lower Bits of said quadrature component from the outputs of said second inverter (6), and output terminals (8a) to be respectively connected to said first input terminals (8c) or said second input terminals (8b) in response to said Most Significant Bit of said quadrature component so that said output terminals (8a) are connected to said first input terminals (8c) when said Most Significant Bit has a low level and to said second input terminals (8b) when said Most Significant Bit has a high level;
   a third switch (9) having first input terminals (9c) respectively connected to said output terminals (8a) of said second switch (8), second input terminals (9b) respectively connected to said output terminals (7a) of said first switch (7), and output terminals (9a) constituting a first group of output terminals of said rotator (2) to be respectively connected to said first input terminals (9c) or said second input terminals (9b) in response to a control signal so that said output terminals (9a) are connected to said second input terminals (9b) when said control signal has a low level and to said first input terminals (9c) when said control signal has a high level;
   a fourth switch (10) having first input terminals (10c) respectively connected to said output terminals (7a) of said first switch (7), second input terminals (10b) respectively connected to said output terminals (8a) of said second switch (8), and output terminals (10a) constituting a second group of output terminals of said rotator to be respectively connected to said first input terminals (10c) or said second input terminals (10b) in response to a control signal so that said output terminals (10a) are connected to said second input terminals (10b) when said control signal has a low level and to said first input terminals (10c) when said control signal has a high level; and
   a first exclusive-or-gate (5) receiving said Most Significant Bit of said inphase component and said Most Significant Bit of said quadrature component and generating said control signal.

4. QAM de-mapping circuit according to claim 3, characterized in that said single quadrant demapper (3) comprises a look-up-table having n=2 input terminals respectively connected to said output terminals (9a, 10a) of said third switch (9) and said fourth switch (10) and n=2 output terminals constituting n=2 output terminals of said de-mapping circuit.

5. QAM de-mapping circuit according to claim 3, characterized in that in a case of n=8, corresponding to 256 QAM, said single quadrant demapper (3) comprises:
   a second exclusive-or-gate (11) connected to the first group of three output terminals of the rotator (2) corresponding to the two bits of lower order;
   a third exclusive-or-gate (12) connected to the first group of three output terminals of the rotator (2) corresponding to the two bits of higher order;

a fourth exclusive-or-gate (13) connected to the second group of three output terminals of the rotator (2) corresponding to the two bits of lower order;

a fifth exclusive-or-gate (14) connected to the second group of three output terminals of the rotator (2) corresponding to the two bits of higher order;

wherein the order of the six outputs of the de-mapping circuit from the lowest to the highest are built by: the output of the second exclusive-or-gate (11), the output of the fourth exclusive-or-gate (13), the output of the third exclusive-or-gate (12), the output of the fifth exclusive-or-gate (14), the output of the first group of three output terminals of the rotator (2) corresponding to the bit of highest order, and the output of the second group of three output terminals of the rotator (2) corresponding to the bit of highest order.

6. QAM de-mapping circuit according to claim 3, characterized in that in a case of n=6, corresponding to 64 QAM, said single quadrant demapper (3) comprises:

a third exclusive-or-gate (12) connected to the first group of two output terminals of the rotator (2);

a fifth exclusive-or-gate (14) connected to the second group of two output terminals of the rotator (2);

wherein the order of the four outputs of the de-mapping circuit from the lowest to the highest are built by: the output of the third exclusive-or-gate (12), the output of the fifth exclusive-or-gate (14), the output of the first group of two output terminals of the rotator (2) corresponding to the bit of highest order, and the output of the second group of two output terminals of the rotator (2) corresponding to the bit of highest order.

7. QAM de-mapping circuit according to claim 3, characterized in that in a case of n=4, corresponding to 16 QAM, the two outputs of the de-mapping circuit from the lowest to the highest are built by: the output of the first group of one output terminal of the rotator (2) and the output of the second group of one output terminal of the rotator (2).

8. QAM de-mapping circuit according to claim 1, characterized in that said differential decoder (1) comprises:

a delay element (15) receiving said 2 Bits of said symbol received and delaying them for one symbol clock; and a look-up-table (16) receiving said delayed 2 Bits and said 2 Bits of said symbol received to output the two highest Bits of the output signal of the de-mapping circuit.

* * * * *